United States Patent
Morishima et al.

(10) Patent No.: US 9,977,281 B2
(45) Date of Patent: May 22, 2018

(54) LIQUID CRYSTAL DISPLAY DEVICE

(71) Applicant: FUJIFILM Corporation, Tokyo (JP)

(72) Inventors: Shinichi Morishima, Kanagawa (JP); Koshin Matsuoka, Kanagawa (JP); Mitsuyoshi Ichihashi, Kanagawa (JP); Akio Tamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 57 days.

(21) Appl. No.: 15/040,306

(22) Filed: Feb. 10, 2016

(65) Prior Publication Data
US 2016/0161799 A1 Jun. 9, 2016

Related U.S. Application Data

(63) Continuation of application No. PCT/JP2014/069441, filed on Jul. 23, 2014.

(30) Foreign Application Priority Data

Aug. 13, 2013 (JP) .................. 2013-167972

(51) Int. Cl.
*G02F 1/1335* (2006.01)
*G02B 5/30* (2006.01)

(52) U.S. Cl.
CPC .......... *G02F 1/133528* (2013.01); *G02B 5/30* (2013.01); *G02F 1/133514* (2013.01);
(Continued)

(58) Field of Classification Search
CPC .......... G02F 1/133528; G02F 1/133514; G02F 1/133621; G02F 2001/133614; G02F 1/133533; G02F 1/133617; G02B 5/30
See application file for complete search history.

(56) References Cited

U.S. PATENT DOCUMENTS

| 2001/0000436 A1* | 4/2001 | Nose | G02F 1/133603 349/65 |
| 2011/0051034 A1* | 3/2011 | Egi | G02F 1/133533 349/61 |

(Continued)

FOREIGN PATENT DOCUMENTS

| JP | 11-52371 A | 2/1999 |
| JP | 11-237632 A | 8/1999 |

(Continued)

OTHER PUBLICATIONS

International Preliminary Report on Patentability issued by WIPO dated Feb. 18, 2016 in connection with International Patent Application No. PCT/JP2014/069441.

(Continued)

*Primary Examiner* — Nathanael R Briggs
(74) *Attorney, Agent, or Firm* — Edwards Neils LLC; Jean C. Edwards, Esq.

(57) ABSTRACT

An object of the present invention is to provide a liquid crystal display device having excellent color reproducibility. A liquid crystal display device of the present invention is a liquid crystal display device including a non-white light source, a rear polarizer, a liquid crystal layer, and a front-side polarizer in this order, in which a light conversion layer that converts a wavelength of light transmitted through the front-side polarizer is provided on a viewer side of the front-side polarizer.

9 Claims, 1 Drawing Sheet

(52) U.S. Cl.
CPC .................. *G02F 1/133621* (2013.01); *G02F 2001/133614* (2013.01)

(56) References Cited

U.S. PATENT DOCUMENTS

| | | | |
|---|---|---|---|
| 2011/0234948 A1* | 9/2011 | Yoon | C09J 4/06 349/96 |
| 2013/0010229 A1* | 1/2013 | Shin | G02F 1/133617 349/62 |

FOREIGN PATENT DOCUMENTS

| | | | |
|---|---|---|---|
| JP | 2000-258771 A | 9/2000 | |
| JP | 2004-271621 A | 9/2004 | |
| JP | 2010-197791 A | 9/2010 | |
| JP | 2013-15812 A | 1/2013 | |
| WO | 2013/179959 A1 | 12/2013 | |

OTHER PUBLICATIONS

International Search Report issued in PCT/JP2014/069441 dated Oct. 14, 2014.

Office Action, issued by the Japanese Patent Office dated Aug. 2, 2016, in connection with corresponding Japanese Patent Application No. 2013-167972.

* cited by examiner

LIQUID CRYSTAL DISPLAY DEVICE

CROSS-REFERENCE TO RELATED APPLICATIONS

This application is a continuation of International Application No. PCT/JP2014/069441 filed on Jul. 23, 2014, which was published under PCT Article 21(2) in Japanese, and which claims priority under 35 U.S.C. § 119(a) to Japanese Patent Application No. 2013-167972 filed on Aug. 13, 2013. The above applications are hereby expressly incorporated by reference, in their entirety, into the present application.

BACKGROUND OF THE INVENTION

1. Field of the Invention

The present invention relates to a liquid crystal display device and, specifically, to a liquid crystal display device including a light conversion layer.

2. Description of the Related Art

Generally, a liquid crystal device includes a liquid crystal layer and a liquid crystal cell including an electrode that applies an electric field to the liquid crystal layer. Since the liquid crystal cell does not emit light on its own, illumination means for illuminating the liquid crystal cell is provided, and illumination light emitted from the illumination means is controlled using the liquid crystal cell, thereby forming desired images.

In addition, recently, a liquid crystal device in which monochromic light (particularly blue light) is used as the illumination means (particularly a backlight) and a light conversion layer that converts the monochromic light to white light is separately provided is known.

For example, JP2004-271621A describes "a liquid crystal device including a liquid crystal layer, a liquid crystal cell including an electrode that applies an electric field to the liquid crystal layer, and illumination means for illuminating the liquid crystal cell, in which the illumination means includes a light-emitting element and a light guide plate that guides light emitted from the light-emitting element to the liquid crystal cell, and light conversion means for converting at least some of the illumination light radiated from the light guide plate to light close to white light is provided" ([claim 1]).

In addition, JP2013-015812A describes "a liquid crystal display device including a backlight unit including an LED that emits monochromic light and a liquid crystal display panel formed on an upper surface of the backlight unit, in which the liquid crystal display panel includes a first substrate, a liquid crystal layer which is formed on an upper surface of the first substrate and transmits monochromatic light, a light conversion layer which is formed on an upper surface of the liquid crystal layer and converts the monochromatic light to white light, an RGB color filter layer formed on an upper surface of the light conversion layer, and a second substrate disposed on an upper surface of the color filter layer" ([claim 11]).

SUMMARY OF THE INVENTION

The present inventors studied the liquid crystal devices (liquid crystal display devices) described in JP2004-271621A and JP2013-015812A and clarified that, in a case in which a quantum dot (for example, refer to claim 2 and the like in JP2013-015812A) is used as the light conversion means(light conversion layer), there is a problem in that color reproducibility (particularly, black color reproducibility) is significantly poor.

Therefore, an object of the present invention is to provide a liquid crystal display device having excellent color reproducibility.

The present inventors carried out intensive studies in order to achieve the above-described object and, consequently, found that a liquid crystal display device including a non-white light source, a rear side polarizer, a liquid crystal layer, a front side polarizer, and a light conversion layer in this order has excellent color reproducibility even in a case in which a quantum dot is used as the light conversion layer and completed the present invention.

That is, it was found that the object can be achieved by the following constitutions.

[1] A liquid crystal display device including a non-white light source, a rear side polarizer, a liquid crystal layer, and a front side polarizer in this order, in which a light conversion layer that converts a wavelength of light transmitted through the front side polarizer is provided on a viewer side of the front side polarizer.

[2] The liquid crystal display device according to [1], in which, out of the rear side polarizer and the front side polarizer, at least the front side polarizer is a monochromatic polarizer corresponding to a light source wavelength of the non-white light source.

[3] The liquid crystal display device according to [2], in which a correspondence relationship between the nonwhite light source and the monochromatic polarizer is a correspondence relationship satisfying Expression. (1) below:

$$A < \{(B/2) + (C/2)\} \qquad (1)$$

herein, in Expression (1), A represents a wavelength difference between peak tops of a light source wavelength of the non-white light source and of an absorption wavelength of the monochromatic polarizer, B represents a full width at half maximum of the light source wavelength of the non-white light source, and C represents a full width at half maximum of the absorption wavelength of the monochromatic polarizer.

[4] The liquid crystal display device according to [2] or [3], in which the monochromatic polarizer is any one of a dichromatic organic dye polarizer, a wire grid polarizer, and a cholesteric liquid crystal polarizer.

[5] The liquid crystal display device according to any one of [1] to [4], in which the light conversion layer is a layer in which individual quantum dots corresponding to blue light, red light, and green light are dispersed and which is capable of converting light transmitted through the front side polarizer to white light formed from mixing of blue light, red light, and green light.

[6] The liquid crystal display device according to any one of [1] to [5], in which light emitted from the non-white light source is monochromatic light made of any one of blue light, red light, and green light.

[7] The liquid crystal display device according to any one of [1] to [4], in which, in a case in which light transmitted through the front side polarizer is predetermined monochromatic light of any one of blue light, red light, and green light, the light conversion layer is a layer in which individual quantum dots corresponding to, out of blue light, red light, and green light, light that is not the predetermined monochromatic light are dispersed and which is capable of transmitting the predetermined monochromatic tight and mixing, out of blue light, red light, and green light, light that is not the predetermined monochromatic light with the predetermined monochromatic light, so as to convert mixed light to white light.

[8] The liquid crystal display device according to any one of [1] to [7], including a color filter on a viewer side of the light conversion layer.

According to the present invention, it is possible to provide a liquid crystal display device having excellent color reproducibility.

DESCRIPTION OF THE PREFERRED EMBODIMENTS

Hereinafter, the present invention will be described in detail.

A liquid crystal display device of the present invention includes a non-white tight source, a rear side polarizer, a liquid crystal layer, and a front side polarizer in this order, in which a light conversion layer that converts a wavelength of light transmitted through the front side polarizer is provided on a viewer side of the front side polarizer.

Meanwhile, in the present specification, numerical ranges expressed using "to" include numerical values before and after the "to" as the lower limit value and the upper limit value.

In the present invention, as described above, even in a case in which a quantum dot is used as a light conversion layer in a liquid crystal display device including a non-white light source, a rear side polarizer, a liquid crystal layer, a front side polarizer, and the light conversion layer in this order, color reproducibility becomes favorable.

Detail of what has been described above is not clear, but is assumed as described below.

That is, it is considered that, since tight emitted from the non-white light source is transmitted through the rear side polarizer, the liquid crystal layer, and the front side polarizer and then is converted to white light using the light conversion layer, thereby preventing depolarization.

This fact can also be assumed from a result that, in the constitution (refer to FIG. 2) of Comparative Example 1 described below which corresponds to the liquid crystal display device of JP2013-015812A, in a case in which a quantum dot is used as the light conversion layer, depolarization occurs, and consequently, color reproducibility is poor.

Next, the overall constitution of the liquid crystal display device of the present invention will be described using FIG. 1, and then individual constitutions will be described in detail.

Figure 1A:
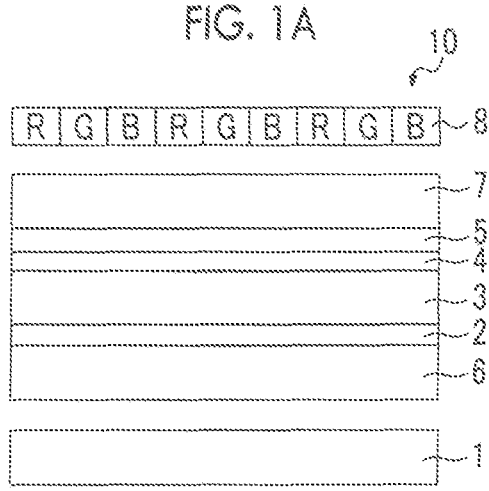
FIGS. 1(A) and 1(B) are respectively schematic sectional views illustrating examples of an embodiment of a liquid crystal display device of the present invention.
Figure 1B:
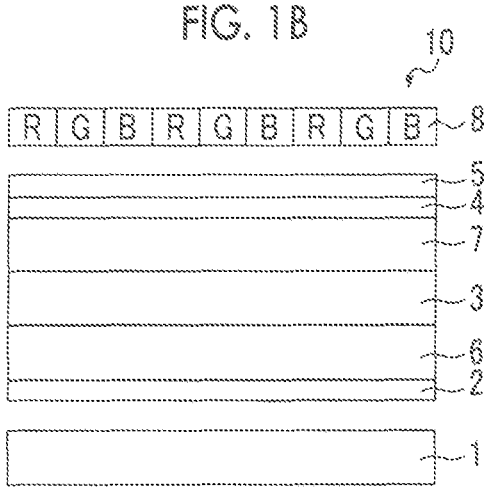

FIGS. 1(A) and 1(B) are respectively schematic sectional views illustrating examples of an embodiment of the liquid crystal display device of the present invention.

As illustrated in FIGS. 1(A) and 1(B), a liquid crystal display device 10 includes a backlight unit 1 including a non-white light source (not illustrated), a rear side polarizer 2, a liquid crystal layer 3, a front side polarizer 4, and a light conversion layer 5 in this order.

In addition, as illustrated in FIGS. 1(A) and 1(B), the liquid crystal display device 10 preferably includes a rear side cell substrate 6 and a from side cell substrate 7 for sandwiching the liquid crystal layer 3, and a color filter 8.

Here, an aspect of a polarizer illustrated in FIG. 1(A) is an in-cell-type polarizer in which the rear side polarizer 2, the front side polarizer 4, and the light conversion layer 5 are sandwiched together with the liquid crystal cell 3 by the rear side cell substrate 6 and the front side cell substrate 7, and an aspect of a polarizer illustrated in FIG. 1(B) is an out-cell-type polarizer in which only the liquid crystal cell 3 is sandwiched by the rear side cell substrate 6 and the front side cell substrate 7, and the front side polarizer 4 and the like are provided on the upper portion (viewer side) of the liquid crystal cell.

[Non-White Light Source]

The non-white light source in the liquid crystal display device of the present invention is not particularly limited as long as the light source emits non-white light (for example, a cold cathode fluorescent lamp, a xenon fluorescent lamp, an LED, an organic EL, and the like).

Specific examples of the non-white light emitted from the non-white light source include monochromatic light made of any one of blue light, red light, and green light; ultraviolet rays; infrared rays; and the like.

Among these, monochromatic light made of any one of blue light, red light, and green light is preferred, and, among these, blue light is more preferred since the energy is high, and it becomes easy to convert the wavelength in the light conversion layer described below.

In the present invention, the non-white light source may constitute the backlight unit together with a plurality of members such as a light guide plate that introduces light emitted from the light source from an end surface, a diffusion plate, and a light collection plate.

As the above-described members constituting the backlight unit, it is possible to use, for example, members described in Chapter 3 of "Advanced Technologies of constituent materials of liquid crystal display devices, edited by Yasufumi Limura, CMC Publishing Co., Ltd.", "Technologies of backlights for liquid crystal display devices, edited by Kalantar Kalil, CMC Publishing Co., Ltd.", and the like.

[Polarizer (Rear Side Polarizer and Front Side Polarizer)]

The rear side polarizer and the front side polarizer (hereinafter, in a case in which no particular distinction is required, both polarizers will also be collectively referred to simply as "polarizer") in the liquid crystal display device of the present invention are not particularly limited, and it is possible to use an ordinary polarizer used in a well-known liquid crystal. display device of the related art.

<Monochromatic Polarizer>

In the present invention, since it becomes possible to decrease the thickness of the polarizer, out of the rear side polarizer and the front side polarizer, at least the front side polarizer is preferably a monochromatic polarizer corresponding to a light source wavelength of the non-white light source, and both the rear side polarizer and the front side polarize are more preferably monochromatic polarizers corresponding to the light source wavelength of the non-white light source.

Here, the "monochromatic polarizer corresponding to the light source wavelength of the non-white light source" refers to a polarizer capable of polarizing light emitted from the non-white light source to linearly polarized light in a high degree of polarization (for example, a degree of polarization of 95% or higher).

In addition, in the present invention, since it becomes possible to decrease the thickness of the polarizer, furthermore, an in-cell-type polarizer in which the disparity of the liquid crystal display device becomes small can be easily produced, and the visibility of the liquid crystal display device becomes favorable, the correspondence relationship between the non-white light source and the monochromatic polarizer is preferably a correspondence relationship satisfying Expression (1) below:

$$A < \{(B/2) + (C/2)\} \tag{1}$$

(In the expression, A represents the wavelength difference between the peak tops of a light source wavelength of the non-white light source and of an absorption wavelength of the monochromatic polarizer, B represents the full width at half maximum of the light source wavelength of the non-white light source, and C represents the full width at half maximum of the absorption wavelength of the monochromatic polarizer.)

Here, regarding the technical meaning of Expression (1), for example, in a case in which the light source is blue light, the monochromatic polarizer satisfying the correspondence relationship of Expression (1) becomes a polarizer which absorbs, out of blue light, a diagonal component of the polarization axis (transmission axis) of the polarizer and transmits linearly polarized light of blue light having a high degree of polarization.

Furthermore, in the present invention, since durability, particularly, heat stability becomes favorable, the monochromatic polarizer is preferably a dichromatic organic dye polarizer, a wire grid polarizer, or a cholesteric liquid crystal polarizer.

Among these, since it is possible to form the polarizer by means of coating, a dichromatic organic dye polarizer is preferred from the viewpoint of a capability of easily producing an in-cell-type polarizer in which the disparity of the liquid crystal display device becomes small.

Examples of a dichromatic organic dye used in the dichromatic organic dye polarizer include dichromatic pigments (azo pigments) described in "0056" to "0081" of JP2010-152351A, compounds represented by the following formulae, and the like.

[Chem. 1]

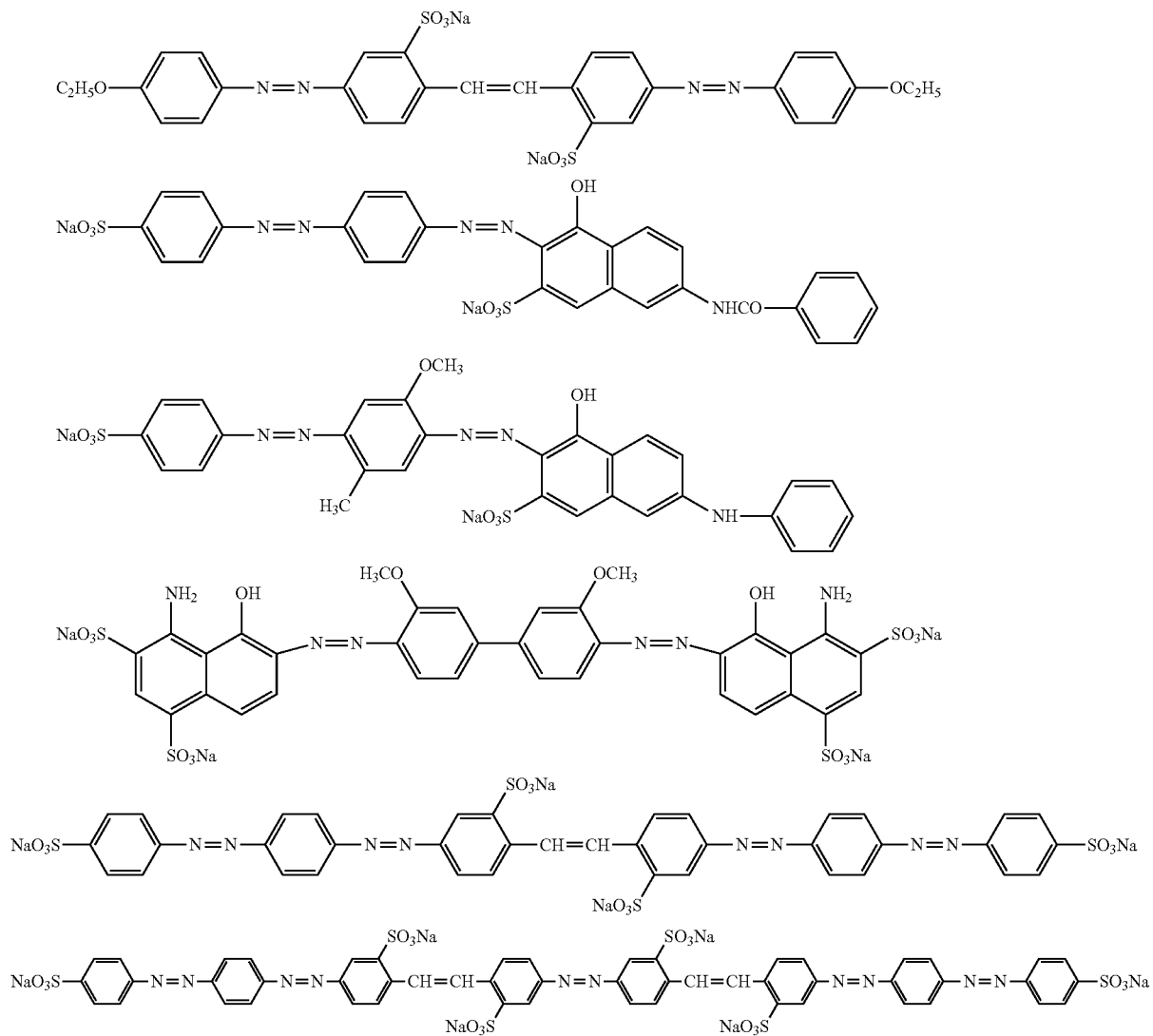

<Method for Producing Dichromatic Organic Dye Polarizer>

Specific examples of a method for producing the dichromatic organic dye polarizer include a method in which a dichromatic organic dye is dissolved in or adsorbed to a high-molecular-weight material such as a polyvinyl alcohol, a film thereof is uniaxially stretched in a film shape, and a dichromatic pigment is oriented; a method which is described in a dissertation (Dryer, J. F., Journal de Physique, 1969, 4, 114, "Light Polarization From Films of Lyotropic Nematic Liquid Crystals") and in which a dichromatic pigment is oriented on a substrate such as a glass substrate or a transparent film using the intermolecular interaction between organic dye molecules, and a polarizer (anisotropic pigment film) is formed; and the like. Meanwhile, the above-described orientating of a dichromatic pigment on a substrate such as a glass substrate or a transparent film using the intermolecular interaction between organic dye molecules is achieved using a wet-type film formation method.

Examples of other production methods include a method in which an extremely thin film including a dichromatic pigment is formed by applying a dichromatic pigment composition onto a transparent support and the dichromatic pigment is oriented using an intermolecular interaction as described in Paragraph "0022" of JP2010-152351A, Paragraph "0211" of JP2011-213610A, and the like.

[Liquid Crystal Layer]

The liquid crystal layer in the liquid crystal display device of the present invention is not particularly limited, and an ordinary liquid crystal layer used in a well-known liquid crystal display device of the related art can be used.

As a material (liquid crystal material) forming the above-described liquid crystal layer, a material used in an ordinary liquid crystal display device can be preferably used. Examples thereof include VA, IPS, TN, OCB, HAN, ECB, STN, DSTN, PSA, a vertical orientation-type in-plane electric field switching liquid crystal, a ferroelectric liquid crystal, an antiferroelectric liquid crystal, a blue-phase liquid crystal, and the like, and specific examples thereof include materials described in Chapter 3 of "Advanced Technologies of constituent materials of liquid crystal display devices, edited by Yasufumi Limura, CMC Publishing Co., Ltd.", and the like.

Among these, the liquid crystal layer is preferably a layer formed by being filled with a nematic liquid crystal material having a positive dielectric anisotropy.

In the present invention, the liquid crystal layer may constitute the liquid crystal cell together with the front side cell substrate and the rear side cell substrate (refer to FIGS. 1(A) and 1(B)), and furthermore, the rear side polarizer and the front side polarizer (refer to FIG. 1(A)) in the case of the in-cell-type polarizer.

Here, examples of the front side cell substrate and the rear side cell substrate include a glass substrate, a plastic substrate, and the like, and, among these, a glass substrate is preferably used.

The liquid crystal cell is preferably a VA-mode liquid crystal cell, an OCB-mode liquid crystal cell, an IPS-mode liquid crystal cell, or a TN-mode liquid crystal cell, but is not limited thereto.

In the TN-mode liquid crystal cell, when a voltage is applied, rod-shaped liquid crystalline molecules are substantially horizontally oriented, and furthermore, are twist-oriented at 60° to 120°. The TN-mode liquid crystal cell is most frequently used as a color TFT liquid crystal display device and is described in a number of publications.

In the VA-mode liquid crystal cell, when a voltage is applied, rod-shaped liquid crystalline molecules are substantially horizontally oriented. Example of the VA-mode liquid crystal cell include (1) a narrowly-defined VA-mode liquid crystal cell in which, when a voltage is not applied, rod-shaped liquid crystalline molecules are substantially vertically oriented, and, when a voltage is applied, rod-shaped liquid crystalline molecules are substantially horizontally oriented (described in JP1990-176625A (JP-J2-176625A)), additionally, (2) a (VA-mode) liquid crystal cell in which the VA mode is made into multi-domains in order to expand the view angle (described in SID97, Digest of tech. Papers (proceedings) 28 (1997) 845), (3) an (n-ASM-mode) liquid crystal cell in which, when a voltage is not applied, rod-shaped liquid crystalline molecules are substantially vertically oriented, and, when a voltage is applied, rod-shaped liquid crystalline molecules are twisted and multi-domain-oriented (described in the proceedings 58 and 59 of Japanese Liquid Crystal Conference (1998)), and (4) a SURVIVAL-mode liquid crystal cell (announced at LCD internal 98). In addition, the VA-mode liquid crystal cell may be any one of a patterned vertical alignment (PVA)-type liquid crystal cell, an optical alignment-type liquid crystal cell, and a polymer-sustained alignment (PSA) type liquid crystal cell. Detail of this mode is described in JP2006-215326A and JP2008-538819A.

In the IPS-mode liquid crystal cell, rod-shaped liquid crystalline molecules are substantially horizontally oriented with respect to a substrate, and, when an electric field parallel to the substrate surface is applied thereto, the liquid crystalline molecules respond in a planar manner. When no electric field is applied thereto, the IPS-mode liquid crystal cell display a black image, and the absorption axes of a pair of top and bottom polarizing plates are orthogonal to each other. A method for improving the view angle by reducing light leakage caused when a black image is displayed in an inclined direction using an optical compensation sheet is disclosed by JP1998-54982A (JP-1110-549802A), JP1999-202323A (JP-H11-202323A), JP1997-292522A (JP-H9-292522A), JP1999-133408A (JP-H11-133408A), JP1999-305217A (JP-H11-305217A), JP1998-307291A (JP-H10-307291A), and the like.

[Light Conversion Layer]

The light conversion layer in the liquid crystal display device of the present invention is provided on (on the viewer side of) the front side polarizer and is not particularly limited as long as the light conversion layer is capable of converting the wavelength of light transmitted through the front side polarizer.

Examples of the light conversion layer include a layer in which a fluorescent body (for example, zinc silicate ($ZnSiO_3$), cadmium silicate ($CdSiO_3$), cadmium borate ($CdB_2O_5$), or the like) which is excited by light transmitted through the front side polarizer (for example, blue light) and emits visible light having a longer wavelength than the above-described light (for example, red light); individual quantum dots corresponding to blue light, red light, and green light; and the like are dispersed.

Here, the quantum dot refers to a semiconductor particle with a predetermined size having a quantum confinement effect.

In the present invention, the light conversion layer is preferably a layer in which individual quantum dots corresponding to blue light, red light, and green light; and the like are dispersed and which is capable of converting light transmitted through the front side polarizer to blue light and white light formed from mixing of blue light, red light, and green light since the color reproducibility becomes more favorable.

The light conversion layer may be constituted so that, for example, in a case in which light transmitted through the front side polarizer is monochromatic light other than blue light, red light, or green light, an ultraviolet ray, or an infrared ray, the transmitted light is filtered to blue light, red light, and green light due to a blue quantum dot, a red quantum dot, and a green quantum dot which are dispersed in the light conversion layer.

Meanwhile, in a case in which light transmitted through the front side polarizer is predetermined monochromatic light of any one of blue light, red light, and green light, the light conversion layer is preferably a layer in which individual quantum dots corresponding to, out of blue light, red light, and green light, light that is not the predetermined monochromatic light are dispersed and which is capable of transmitting the predetermined monochromatic light and mixing, out of blue light, red light, and green light, light that is not the predetermined monochromatic light with the predetermined monochromatic light so as to convert to white light since the color reproducibility becomes more favorable.

For example, in a case in which the light transmitted to the front side polarizer is blue light, the light conversion layer includes at least a red quantum dot and a green quantum dot. That is, when some of blue light is converted to red light having a wavelength in a range of 620 nm to 750 nm using the red quantum dot, some of blue light is converted to green light having a wavelength in a range of 495 nm to 570 nm using the green quantum dot, and blue light which is not converted to red light and green light is transmitted through the light conversion layer without any changes, white light formed, from mixing of blue light, red light, and green light is generated in the light conversion layer.

Similarly, in a case in which the light transmitted through the front side polarizer is red light, the light conversion layer includes a blue quantum dot and a green quantum dot, and, in a case in which the light transmitted through the front side polarizer is green light, the light conversion layer includes a blue quantum dot and a red quantum dot.

[Color Filter]

The liquid crystal display device of the present invention may include a color filter on the viewer side of the light conversion layer as necessary (refer to FIG. 1) since an influence of external light (natural light) on the light conversion layer is reduced, and the color reproducibility becomes more favorable.

The color filter generally has a structure in which red, green, and blue dot-shaped images are respectively disposed on a substrate in a matrix shape and boundaries therebetween are partitioned using a deep color image-separating wall such as a black matrix.

In the color filter, a dye may be used as a color material or a pigment may be used as a color material, and, in the present invention, any color filter including a dye or a pigment can be preferably used.

Examples of the dye or the pigment include dyes and pigments described in JP2009-139616A.

In addition, examples of a method for producing the color titter include a dyeing method, a printing method, a coloring resist method, a transcription method, an ink jet method, and the like.

EXAMPLES

Hereinafter, the present invention will be described in more detail on the basis of examples. Materials, used amounts, proportions, processing contents, processing orders, and the like described in the following examples can be appropriately altered within the gist of the present invention. Therefore, the scope of the present invention should not be limitedly interpreted by the examples described below.

<Production of Dichromatic Organic Dye Polarizer>

A yellow dichromatic azo pigment (A-4: Exemplary Compound A-4 described in Paragraphs "0238" to "0242" of JP2011-213610A) (1 part by mass) which is represented by the following formula and corresponded to a blue LED light source was added to chloroform (99 parts by mass), was dissolved by means of stirring, and then was filtered, thereby preparing a coating fluid of a dichromatic pigment composition.

Next, the coating fluid was applied onto a polyvinyl alcohol oriented film which had been formed and rubbed in advance on a glass substrate, and chloroform was naturally dried at room temperature, thereby fixing the orientation state.

Next, a coating fluid for an oxygen-shielding layer described below was applied thereto and was dried at 100° C. for two minutes. Furthermore, a coating fluid for a transparent resin cured layer A described below was applied thereto and was dried at 100° C. for two minutes. After that, the coating fluid was polarized by radiating 5 J ultraviolet rays in a nitrogen atmosphere (with an oxygen concentration of 100 ppm or lower), thereby producing a polarization element including a 1 μm-thick oxygen-shielding layer and a 2 μm-thick transparent resin cured layer sequentially laminated on a surface of a light absorption anisotropic layer (layer thickness: 0.4 μm).

Meanwhile, the peak top of the absorption wavelength of the produced polarization element was 460 nm and the full width at half maximum was 110 nm.

[Chem. 2]

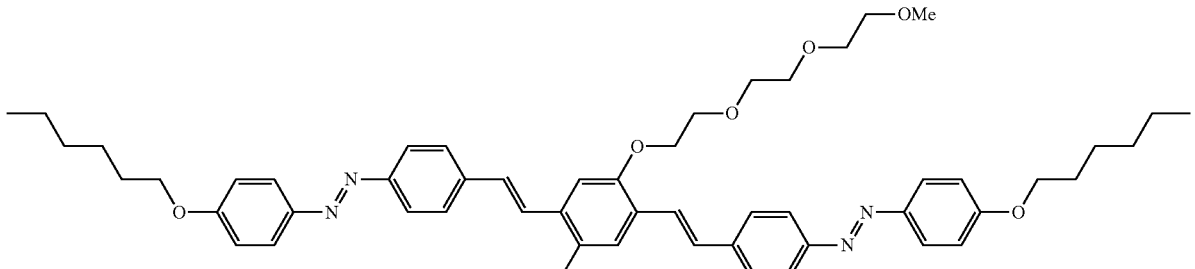

Dichromatic azo pigment A-4

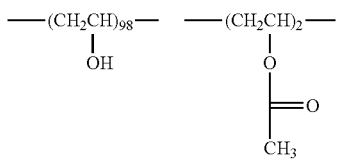

Polyvinyl alcohol (Preparation of Coating Fluid for Oxygen-Shielding Layer)

The following composition was injected into a mixing tank and was stirred, thereby producing a coating fluid for the oxygen-shielding layer.

Polyvinyl alcohol (PVA205, manufactured by Kuraray Co., Ltd.) (3.2 parts by mass), polyvinylpyrrolidone (PVP K-30, manufactured by Nippon Shokubai Co., Ltd.) (1.5 parts by mass), methanol (44 parts by mass), and water (56 parts by mass) were added thereto and were stirred.

Next, the solution was filtered using a polypropylene filter having a pore diameter of 0.4 μm, thereby preparing a coating fluid for the oxygen-shielding layer.

(Preparation of Coating Fluid for Transparent Resin Cured Layer A)

The following composition was infected into a mixing tank and was stirred, thereby producing a coating fluid for the transparent resin cured layer A.

Poly(glycidylmethacrylate) having a mass-average molecular weight of 15000 (2.7 parts by mass), methyl ethyl ketone (7.3 parts by mass), cyclohexanone (5.0 parts by mass), and a polymerization initiator (IRGACURE 184 manufactured by BASF) (0.5 parts by mass) were added to trimethylolpropane triacrylate (VISCOAT #295, manufactured by Osaka Organic Chemical Industry Ltd.) (7.5 parts by mass) and were stirred.

Next, the solution was filtered using a polypropylene filter having a pore character of 0.4 μm so as to produce a coating fluid for a hardcoat layer, thereby preparing a coating fluid for the transparent resin cured layer A.

<Production of Iodine Polarizer>

According to Example 1 of JP2001-141926A, iodine was adsorbed to a stretched polyvinyl alcohol film, thereby producing a polarizer (iodine polarizer) having a film thickness of 20 μm.

<Production of Wire Grid Polarizer>

According to Example 1 described in "0073" to "0077" of JP2012-027221A, a wire grid polarizer was produced.

<Production of Cholesteric Liquid Crystal Polarizer>

According to Example 1 described in "0072" to "0077" of JP2004-258405A, a cholesteric liquid crystal polarizer was produced.

Example 1 (Out-Cell, Dichromatic Organic Dye Polarizer)

A polyimide oriented film was formed on a glass substrate (cell substrate) including a transparent electrode, and an orientation treatment was carried out by means of rubbing.

The rubbing-treated glass substrate and another glass substrate that had undergone, the same treatment cell substrate) were disposed through a 2.8 μm uniform particle diameter spacer with the rubbing-treated surfaces of the substrates facing each other, the liquid crystal cell gap was set to 4.2 μm, and a liquid crystal composition (ZL11132, manufactured by Merck KGaA) was injected dropwise and enclosed between the substrates, thereby producing a liquid crystal cell.

The dichromatic organic dye polarizers produced in advance were attached to the top and bottom of the produced liquid crystal cell using an adhesive so that the absorption axes of the dichromatic organic dye polarizers coincided with the rubbing direction of the cell substrate in the liquid crystal cell.

Next, a light conversion layer in which a red quantum dot and a green quantum dot were dispersed was formed on (on the viewer side of) the front side polarizer, and furthermore, an RGB color filter was formed on the surface of the formed light conversion layer so that the RGB of the color filter corresponded to the RGB of the liquid crystal cell.

Next, a backlight (light source: a blue LED, light source peak top: 465 am, and full width at half maximum: 30 am) was attached to the bottom of the rear side polarizer, thereby producing a liquid crystal display device illustrated in FIG. 1(B).

Meanwhile, the produced liquid crystal display device had A−465−460=5 nm, B=30 nm, and C=110 nm and thus satisfied Expression (1) below.

$$A < \{(B/2)+(C/2)\} \quad (1)$$

(In the expression, A represents the wavelength difference between the peak tops of a light source wavelength of the non-white light source and of an absorption wavelength of the monochromatic polarizer, B represents the full width at half maximum of the light source wavelength of the non-white light source, and C represents the full width at half maximum of the absorption wavelength of the monochromatic polarizer.)

[Chem. 3]

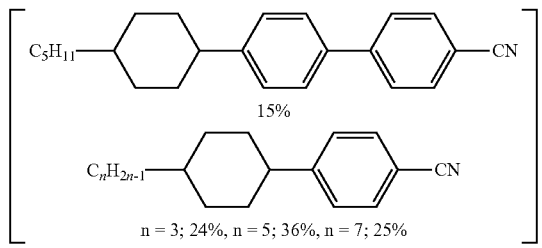

ZLI-1132
ZLI-1132 Merck's commercially available product

Example 2

A liquid crystal display device was produced using the same method as in Example 1 except for the fact that, in the production of a dichromatic organic dye polarizer to be used, the yellow dichromatic azo pigment (A-4) was changed to a magenta dichromatic pigment (A-46: Exemplary Compound A1-46 described in Paragraph "0098" of 22011-213610A) which is represented by the following formula.

Meanwhile, the peak top of the absorption wavelength of the produced polarization element was 565 nm and the full width at half maximum was 130 nm.

In addition, the produced liquid crystal display device had A=565−465=100 nm, B=30 nm, and C=130 nm and thus failed to satisfy Expression (1) below.

$$A<\{(B/2)+(C/2)\} \quad (1)$$

(In the expression, A represents the wavelength difference between the peak tops of a light source wavelength of the non-white light source and of an absorption wavelength of the monochromatic polarizer, B represents the full width at half maximum of the light source wavelength of the non-white light source, and C represents the full width at half maximum of the absorption wavelength of the monochromatic polarizer.)

[Chem. 4]

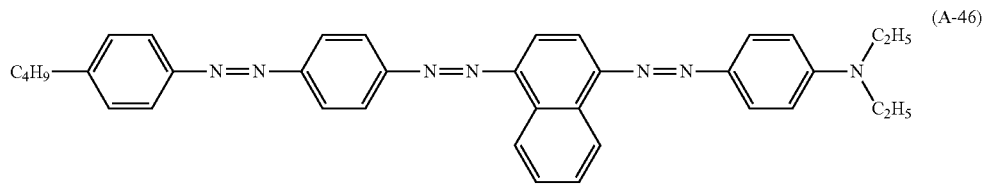

(A-46)

Example 3 (In-Cell, Iodine Polarizer)

(1) Formation of Front Side Polarizer-Attached Liquid Crystal Cell Substrate

A light conversion layer produced in the same manner as in Example 1 was disposed on the transparent electrode surface of a liquid crystal cell substrate. The iodine polarizer produced in advance was attached onto the light conversion layer through an adhesive film. Furthermore, a polyimide oriented film was formed on the iodine polarizer in the same manner as in Example 1, and an orientation treatment was carried out by means of rubbing.

Next, an RGB color filter was formed on the surface of the liquid crystal cell substrate opposite to the transparent electrode so that the RGB of the color filter corresponded to the RGB of the liquid crystal cell to be produced, thereby forming a front side polarizer-attached liquid crystal cell substrate.

(2) Formation of Rear Side Polarizer-Attached Liquid Crystal Cell Substrate

The iodine polarizer produced in advance was attached onto the transparent electrode surface of a liquid crystal cell substrate, and, furthermore, a polyimide oriented film was formed on the iodine polarizer in the same manner as in Example 1, and an orientation treatment was carried out by means of rubbing, thereby forming a rear side polarizer-attached liquid crystal cell substrate.

A liquid crystal cell was produced using the produced liquid crystal cell substrate in the same mariner as in Example 1, and a backlight (light source: a blue LED) was attached to the bottom of the rear side polarizer, thereby producing a liquid crystal display device illustrated in FIG. 1(A).

Example 4 (Out-Cell, Wire Grid Polarizer)

A liquid crystal display device was produced using the same method as in Example 1 except for the fact that the wire grid polarizer produced in advance was used instead of the dichromatic organic dye polarizer.

Example 5 (Out-Cell, Cholesteric Liquid Crystal Polarizer)

A liquid crystal display device was produced using the same method as in Example 1 except for the fact that the cholesteric liquid crystal polarizer produced in advance was used instead of the dichromatic organic dye polarizer.

Example 6 (In-Cell, Wire Grid Polarizer)

A liquid crystal display device was produced using the same method as in Example 3 except for the fact that the wire grid polarizer produced in advance was used instead of the iodine polarizer.

Example 7 (In-Cell, Cholesteric Liquid Crystal Polarizer)

A liquid crystal display device was produced using the same method as in Example 3 except for the fact that the cholesteric liquid crystal polarizer produced in advance was used instead of the iodine polarizer.

Example 8 (In-Cell, Dichromatic Organic Dye Polarizer)

A liquid crystal display device was produced using the same method as in Example 3 except for the fact that the dichromatic organic dye polarizer produced in advance was used instead of the iodine polarizer.

Comparative Example 1 (Out-Cell, Iodine Polarizer)

A liquid crystal cell was produced using the same method as in Example 1.

A laminate including a light conversion layer in which a red quantum dot and a green quantum dot were dispersed formed on (on the viewer side of the produced liquid crystal cell was produced.

Next, the iodine polarizers produced in advance were attached to the top and bottom of the produced laminate using an adhesive so that the absorption axes of the iodine polarizers coincided with the rubbing direction of the cell substrate in the liquid crystal cell.

Figure 2:
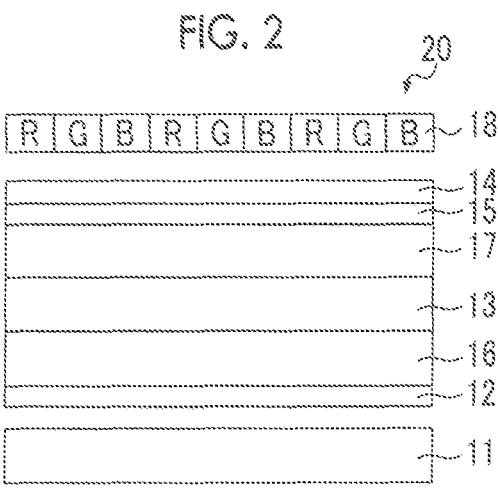
FIG. 2 is a schematic sectional view illustrating an example of an embodiment of a liquid crystal display device of the related art.

Next, a backlight was attached to the bottom of the rear iodine polarizer, thereby producing a liquid crystal display device illustrated in FIG. 2 (Reference 11: backlight unit, Reference 12: rear side polarizer, Reference 13: liquid crystal layer, Reference 14: front side polarizer, Reference 15: light conversion layer, Reference 16: rear side cell substrate, Reference 17: front side cell substrate, Reference 18: color filter, and Reference 20: liquid crystal display device).

<Color Reproducibility, Disparity, and Visibility>

The color reproducibility, disparity, and (front surface/inclined) visibility of each of the produced liquid crystal display devices were marked in three levels of A to C (A: favorable through C: poor) using methods and standards described below. The results are shown in Table 1 below.

(Color Reproducibility)

Generally, color reproducibility is determined using the color of light radiated from red, green, and blue pixels and is expressed using an area of a triangle surrounded by three points $(x_R, y_R)$, $(x_G, y_G)$, and $(x_B, y_B)$, which represents the chromaticity of the respective pixels in the CIE 1931XYZ color coordinate system, in an x-y chromaticity diagram. That is as the area of the triangle increases, it becomes possible to reproduce clearer color images. Generally, the area of the triangle is based on a triangle formed by three points of three primary colors (red (0.67, 0.33), green. (0.21, 0.71), and blue (0.14, 0.08)) in the standard method specified by US' National Television System Committee (NTSC) and is expressed as a ratio with respect to the area of this triangle (unit %, hereinafter, abbreviated as "NTSC ratio").

The NTSC ratio of each of the produced liquid crystal display devices was computed and was evaluated using the following standards.

A: 90% or higher
B: 60% or higher and lower than 90%
C: Lower than 60%

(Disparity)

The luminance values of a black image and a white image displayed by the produced liquid crystal display device in a 45°-inclined direction were measured using a BM-5A manufactured by Topcon Corporation in a dark room, and white luminance/black luminance was computed and was evaluated using the following standards.

A: 100 or higher
B: 60 or higher and lower than 100
C: Lower than 60

(Visibility)

The produced liquid crystal display device was made to display a black image, the intensity of light (orthogonal transmitted light: leaked light) leaked in the normal direction, to a liquid crystal panel (a substantially vertical direction) was visually observed, and the front surface visibility was evaluated using the following standards.

In addition, the chromaticity $(u(\perp), v(\perp))$ seen in a substantially vertical direction when the liquid crystal display device displayed a black image and the chromaticity $(u(45), v(45))$ seen in an orientation inclined up to a maximum of 60° from the normal direction to the display surface were measured using a BM-5A manufactured by Topcon Corporation, a disparity $\Delta u'v'$ was computed, the maximum value of $\Delta u'v'$ in a range of $0 \leq \theta \leq 60°$ was obtained, and the visibility was evaluated using the following standards.

<Front Surface Visibility>
A: Even a dark image clearly appears (=high contrast)
B: A dark image does not clearly appears (=low contrast)

<Inclined Visibility>
A: $\Delta u'v' \leq 0.02$
B: $0.02 < \Delta u'v' \leq 0.03$
C: $\Delta u'v' > 0.03$ <Polarizer Durability>

For the polarizers used in the examples and the comparative examples, durability was evaluated.

Specifically, durability was evaluated in an aspect in which the polarizer was attached to a glass substrate through an adhesive.

First, two samples (approximately 5 cm×5 cm) were produced by attaching 1 polarizer onto the glass substrate.

Next, the produced sample was set with the film side of the sample facing a light source, the orthogonal transmittance was measured in a range of 380 nm to 780 nm using a UV3100PC (manufactured by Shimadzu Corporation), and the value measured at 410 nm was employed. Meanwhile, the orthogonal transmittance was measured for each of the two samples, and the average value thereof was used as the orthogonal transmittance of the polarizer.

After that, the sample was preserved in an, environment of 80° C. and a relative humidity of 90% for 336 hours, and then the orthogonal transmittance was measured using the same method. Meanwhile, the relative humidity in an environment with no humidity conditioning was in a range of 0% to 20%.

A change in the orthogonal transmittance before and after the preservation was observed, and the durability of the polarizer was evaluated using the following standards. The results are shown in Table 1 below.

A: Smaller than 0.6%
B: 0.6% to 1.0%
C: Greater than 1.0%

TABLE 1

| Liquid crystal display device | Non-white light source | Polizer (rear side polarizer and front side polarizer) | | Satisfaction of correspondence relationship of Expression (1) | Light conversion layer (quantum dot) | Color reproducibility | Disparity | Visibility | | Durability of polarizer |
|---|---|---|---|---|---|---|---|---|---|---|
| (layer constitution) | (emitted light) | Type | Material | | | | | Front surface | Inclined | |
| Example 1 | FIG. 1(B) | Blue light | Out-cell | Dichromatic organic dye | Satisfied | Red and green | A | B | A | A | A |
| Example 2 | FIG. 1(B) | Blue light | Out-cell | Dichromatic organic dye | Not satisfied | Red and green | A | B | B | B | A |
| Example 3 | FIG. 1(A) | Blue light | In-cell | Iodine | Satisfied | Red and green | A | A | A | A | C |
| Example 4 | FIG. 1(B) | Blue light | Out-cell | Wire grid | Satisfied | Red and green | B | B | A | A | A |
| Example 5 | FIG. 1(B) | Blue light | Out-cell | Cholesteric liquid crystal | Satisfied | Red and green | B | B | A | A | A |
| Example 6 | FIG. 1(A) | Blue light | In-cell | Wire grid | Satisfied | Red and green | B | A | A | A | A |
| Example 7 | FIG. 1(A) | Blue light | In-cell | Cholesteric liquid crystal | Satisfied | Red and green | B | A | A | A | A |

TABLE 1-continued

| | Liquid crystal display device (layer constitution) | Non-white light source (emitted light) | Polizer (rear side polarizer and front side polarizer) | | Satisfaction of correspondence relationship of Expression (1) | Light conversion layer (quantum dot) | Color reproducibility | Disparity | Visibility | | Durability of polarizer |
|---|---|---|---|---|---|---|---|---|---|---|---|
| | | | Type | Material | | | | | Front surface | Inclined | |
| Example 8 | FIG. 1(A) | Blue light | In-cell | Dichromatic organic dye | Satisfied | Red and green | A | A | A | A | A |
| Comparative Example 1 | FIG. 2 | Blue light | Out-cell | Iodine | Satisfied | Red and green | C | C | B | C | C |

As shown in Table 1, it was found that, in the constitution (FIG. 2) of Comparative Example 1 corresponding to the liquid crystal display device of JP2013-015812A, the light conversion layer was provided on the bottom (light source side) of the front side polarizer, and thus, in a case in which a quantum dot was used as the light conversion layer, the color reproducibility was poor. In addition, it was found that, since the iodine polarizer was used, the durability of the polarizer was also poor.

In contrast, in the constitutions (FIG. 1) of Examples 1 to 8 in which the light conversion layer was provided on the viewer side of the front side polarizer, it was found that light emitted from the non-white light source was transmitted through the liquid crystal layer and the front side polarizer and then was converted to white light due to the light conversion layer, and thus depolarization did not occur, and the color reproducibility became favorable.

Particularly, from comparison between Examples 1 and 2, it was found that, when the correspondence relationship between the nonwhite light source and the monochromatic polarizer was the correspondence relationship satisfying Expression (1), the visibility became favorable.

In addition, from comparison between Example 3 and other examples, it was found that, in a case in which the dichromatic organic dye polarizer, the wire grid polarizer, or the cholesteric liquid crystal polarizer was used as the monochromatic polarizer, the durability of the polarizer became favorable.

In addition, from comparison between Examples 1 and 8, it was found that, when the polarizer was used as the polarizer, the disparity became small.

EXPLANATION OF REFERENCES 1, 11: backlight unit
2, 12: rear side polarizer
3, 13: liquid crystal layer
4, 14: front side polarizer
5, 15: light conversion layer
6, 16: rear side cell substrate
7, 17: front side cell substrate
8, 18: color filter
10, 20: liquid crystal display device

What is claimed is:

1. A liquid crystal display device, comprising:
a non-white light source, a rear polarizer, a liquid crystal layer, and a front-side polarizer in this order,
wherein a light conversion layer that converts a wavelength of light transmitted through the front-side polarizer is provided on a viewer side of the front-side polarizer;
wherein, out of the rear polarizer and the front-side polarizer, at least the front-side polarizer is a monochromatic polarizer corresponding to a light source wavelength of the non-white light source;
wherein the monochromatic polarizer is a dichromatic organic dye polarizer; and
wherein a correspondence relationship between the non-white light source and the monochromatic polarizer is a correspondence relationship satisfying Expression (1) below:

$$A<\{(B/2)+(C/2)\} \quad (1)$$

herein, in Expression (1), A represents a wavelength difference between peak tops of a light source wavelength of the non-white light source and of an absorption wavelength of the monochromatic polarizer, B represents a full width at half maximum of the light source wavelength of the non-white light source, and C represents a full width at half maximum of the absorption wavelength of the monochromatic polarizer.

2. The liquid crystal display device according to claim 1, wherein the light conversion layer is a layer in which individual quantum dots corresponding to blue light, red light, and green light are dispersed and which is capable of converting light transmitted through the front-side polarizer to white light formed from mixing of blue light, red light, and green light.

3. The liquid crystal display device according to claim 1, wherein light emitted from the non-white light source is monochromatic light made of any one of blue light, red light, and green light.

4. The liquid crystal display device according to claim 2, wherein light emitted from the non-white light source is monochromatic light made of any one of blue light, red light, and green light.

5. The liquid crystal display device according to claim 1, wherein, in a case in which light transmitted through the front-side polarizer is predetermined monochromatic light of any one of blue light, red light, and green light, the light conversion layer is a layer in which individual quantum dots corresponding to, out of blue light, red light, and green light, light that is not the predetermined monochromatic light are dispersed and which is capable of transmitting the predetermined monochromatic light and mixing, out of blue light, red light, and green light, light that is not the predetermined monochromatic light with the predetermined monochromatic light, so as to convert mixed light to white light.

6. The liquid crystal display device according to claim 2, comprising:

a color filter on a viewer side of the light conversion layer.

7. The liquid crystal display device according to claim 3, comprising:

a color filter on a viewer side of the light conversion layer.

8. The liquid crystal display device according to claim 4, comprising:

a color filter on a viewer side of the light conversion layer.

9. The liquid crystal display device according to claim 5, comprising:

a color filter on a viewer side of the light conversion layer.

* * * * *